(12) United States Patent
Niederoest et al.

(10) Patent No.: US 6,716,890 B1
(45) Date of Patent: Apr. 6, 2004

(54) POLYURETHANE FOAMS WITH FINE CELL SIZE

(75) Inventors: Beat Niederoest, Marlton, NJ (US); Chiu Y. Chan, Wilmington, DE (US); Neil Craig Silverman, Huntington Beach, CA (US)

(73) Assignee: Foamex L.P., Linwood, PA (US)

( * ) Notice: Subject to any disclaimer, the term of this patent is extended or adjusted under 35 U.S.C. 154(b) by 0 days.

(21) Appl. No.: 10/354,925

(22) Filed: Jan. 30, 2003

(51) Int. Cl.⁷ .............................................. C08G 18/28
(52) U.S. Cl. ................. 521/126; 521/128; 521/130; 521/137; 521/170; 521/174
(58) Field of Search ................ 521/126, 128, 521/130, 137, 170, 174

(56) References Cited

U.S. PATENT DOCUMENTS

| | | |
|---|---|---|
| 4,285,893 A | 8/1981 | Contastin |
| 4,554,295 A * | 11/1985 | Ridge, Jr. .................... 521/110 |
| 4,777,186 A | 10/1988 | Stang et al. |
| 4,783,291 A | 11/1988 | Pagan |
| 4,883,825 A | 11/1989 | Westfall et al. |
| 5,128,381 A | 7/1992 | Tane et al. |
| 5,130,346 A | 7/1992 | Ishii et al. |
| 5,194,453 A | 3/1993 | Jourquin et al. |
| 5,369,138 A | 11/1994 | Gansen |
| 5,476,619 A | 12/1995 | Nakamura et al. |
| 5,500,452 A | 3/1996 | Baker, Jr. et al. |
| 5,521,226 A | 5/1996 | Bleys |
| 5,605,939 A | 2/1997 | Hager |
| 5,648,559 A | 7/1997 | Hager |
| 5,650,452 A | 7/1997 | Thompson et al. |
| 5,668,378 A | 9/1997 | Treboux et al. |
| 5,674,920 A | 10/1997 | Obata et al. |
| 5,698,609 A | 12/1997 | Lockwood et al. |
| 5,708,045 A | 1/1998 | Thompson et al. |
| 5,718,856 A | 2/1998 | Kinkelaar et al. |
| 5,804,113 A | 9/1998 | Blackwell et al. |
| 5,968,993 A | 10/1999 | Bleys |
| 6,051,622 A | 4/2000 | Kinkelaar et al. |
| 6,063,309 A | 5/2000 | Hager et al. |
| 6,136,878 A | 10/2000 | Free et al. |
| 6,337,356 B1 * | 1/2002 | Zaschke et al. ............. 521/174 |
| 6,372,812 B1 | 4/2002 | Niederoest et al. |

FOREIGN PATENT DOCUMENTS

WO    WO 93 099 34    5/1993

* cited by examiner

*Primary Examiner*—John M. Cooney, Jr.
(74) *Attorney, Agent, or Firm*—Connolly Bove Lodge & Hutz LLP

(57) ABSTRACT

Polyurethane foams formed using a specific mixture of polyether and graft polyols with toluene diisocyanate have fine cell size (over 70 pores per inch) and higher durability with $IFD_{25}$ retention over 70% after 12,000 cycles of roll-shear. The foam-forming ingredients are mixed together and foamed at controlled pressures in the range 1.0 to 1.5 (absolute), preferably 1.05 to 1.5 bar (absolute). The foams make particularly good carpet cushions.

19 Claims, 1 Drawing Sheet

POLYURETHANE FOAMS WITH FINE CELL SIZE

This invention relates to flexible polyurethane foams used in carpet cushions and flooring underlayments. Produced at or preferably above atmospheric conditions from certain foaming mixtures, the foams of this invention provide higher support and higher durability than more conventional polyurethane foams previously used in these applications.

BACKGROUND OF THE INVENTION

Polyurethane foams with varying density and hardness may be formed. Hardness is typically measured as IFD ("indentation force deflection") or CFD ("compression force deflection"). Specifically, $IFD_{25}$ is the force required to compress the foam to 25% of its original thickness or height, and $IFD_{65}$ is the force required to compress the foam to 65% of its original thickness or height. Tensile strength, tear strength, compression set, air permeability, fatigue resistance, support factor, and energy absorbing characteristics may also be varied, as can many other properties. Specific foam characteristics depend upon the selection of the starting materials, the foaming process and conditions, and sometimes on the subsequent processing.

Among many applications, polyurethane foams are widely used for carpet cushions and underlayments. Typically, a one-half inch thick foam pad is placed between the subflooring and the carpet. For such a thin pad to be an effective cushion, the foam generally must be quite firm, and will typically have an $IFD_{25}$ above 100 pounds.

Two categories of polyurethane foams presently are used as carpet cushions. "Prime" carpet cushions are foams specifically poured for that application. Prime carpet cushions generally have densities of about 3.5 pounds per cubic foot ("pcf" or "lb/ft$^3$") or less. "Rebond" carpet cushions are formed from pieces of recycled polyurethane foam. Typically, the recycled polyurethane foams had densities of about 1–2 pcf. The recycled polyurethane foams are ground to smaller pieces that are then mixed together with bonding agents and compressed and cured to form a composite material that has a density generally in the range of 6 to 8 pcf. The composite material is sliced to desired thickness to form the rebond carpet cushion. Because it is formed from recycled foams, rebond tends to have a variegated or irregular surface appearance.

A key performance measurement for carpet cushion is durability. Heretofore, prime carpet cushion with its generally lower density has been perceived as less durable than rebonded carpet cushion. On the other hand, prime carpet cushion benefits from having consistent face surfaces, whereas the lumpy surfaces of rebonded carpet cushion have been perceived to indicate lower quality. In general, consumers subjectively correlate a foam having a fine cell structure and a smoother surface with better comfort.

Typically, "durability" of a foam is gauged by its fatigue resistance, which can be measured using two methods: (1) the roll shear test; and (2) the hexapod fatigue test. The roll shear fatigue test was developed to determine the fatigue resistance of foam carpet cushions under simulated end use compression and shear. In this test, a foam sample is cut and formed into a belt that is wrapped around a top roll of a pair of compression rollers. In setting up this test, a 190-pound weight is applied to the sample to determine the amount of compression that the foam cushion undergoes during a normal walking step. This same amount of compression is applied to the foam sample during the roll shear test by adjusting the gap between the two rolls of the test unit. Shear is supplied by rotating the rolls at different rates. Hence, in each cycle, the foam sample belt is sheared and compressed as it is pulled through the rotating rolls. Typically, the roll shear test is run for 12,000 cycles, and fatigue is measured by determining the percent loss of $IFD_{25}$ and thickness. In calculating the percent loss, the initial $IFD_{25}$ and thickness measurements are taken before the start of the test, and the final measurements are taken 24 hours after the completion of 12,000 cycles.

Using the roll shear fatigue test, it is expected that 12,000 cycles approximate the wear on a foam carpet cushion after five years of residential use. In general, higher density foams will provide better fatigue resistance. For example, after 12,000 cycles in the roller shear fatigue test, a conventional 3 pound per cubic foot (pcf) prime carpet cushion foam retains about 50% of $IFD_{25}$, whereas a rebonded foam with a density of 6 to 8 pcf retains about 70% of $IFD_{25}$.

The second test, the hexapod fatigue test, is described in ASTM D 5252-92. In this test, a rotatable drum containing a metal hexapod with six polyurethane studs is used to measure wear and fatigue. Specifically, one surface of the foam sample to be tested is attached to the inside surface of the rotatable drum and a carpet sample is attached to the opposite surface of the foam specimen. The metal hexapod rolls randomly on the surface of the carpet inside the rotating drum for a specified number of revolutions (cycles). The foam samples are then inspected and rated visually on a scale of 0 to 5. The higher the rating indicates the better quality of the sample, and therefore higher durability. Again, higher density foams will usually perform better in this test.

For carpet cushion applications, polyether polyurethane foams are overwhelmingly preferred over polyester polyurethane foams, because the former have far superior hydrolytic stability and hence will be more resistant to degradation from exposure to moisture. Cellular polyurethane structures typically are prepared by generating a gas during polymerization of a liquid reaction mixture comprised of a polyester or polyether polyol, an isocyanate, a surfactant, catalyst and one or more blowing agents. The gas causes foaming of the reaction mixture to form the cellular structure. The surfactant stabilizes the structure.

Once the foam-forming ingredients are mixed together, it is known that the polyurethane foam may be formed under either elevated or reduced controlled pressure conditions. PCT Published Patent Application WO 93/09934 discloses methods for continuously producing slabs of urethane polymers under controlled pressure conditions. The foam-forming mixture of polyol, isocyanate, blowing agent and other additives is introduced continuously onto a moving conveyor in an enclosure with two sub-chambers. The foaming takes place at controlled pressure. Reaction gases are exhausted from the enclosure as necessary to maintain the desired operating pressure. The two sub-chambers, a saw, and air-tight doors are operated in a manner that allows for continuous production of slabstock polyurethane foam.

U.S. Pat. No. 5,804,113 to Blackwell, et al., shows a method and apparatus for continuously producing slabstock polyurethane foam under controlled pressure conditions in which a layer of gas surrounds the reaction mixture during free rise expansion of the reaction mixture to prevent pressure fluctuations. Blackwell generally describes foam reaction mixtures that may include a variety of polyols and isocyanates, and does not express preference for any specific combinations.

U.S. Pat. No. 4,777,186 to Stang, et al., describes a method of foaming in a pressurized chamber held above atmospheric pressure (i.e., in the range of about 0.5 to 1000 psig). In addition to the gases emitted during foaming, additional gases may be introduced into the chamber to maintain the elevated pressure during foaming. The resulting foams have a higher IFD to density ratio than those previously known in the art.

Fine-celled, high durability polyurethane foams are produced using an isocyanate component with a high methylene diisocyanate ("MDI") content, in U.S. Pat. No. 6,136,878 to Free, et al. The cells were fine with over 87 cells per inch, as measured via pressure drop. Foams from 3.2 to 4.3 lb/ft$^3$ density could be made at atmospheric pressure with the fine cell structure.

To date, the use of MDI in foam formulations for carpet cushions is still limited, primarily due to processing difficulties when foaming MDI foam formulations in commercial foaming machines. Specifically, trough build-up and a steep reactivity profile for MDI-containing polyurethane foams make the operating window very narrow. The operating window is often defined by the range of catalysis that can be used to make an acceptable foam that is free of any physical cracks, cleavage and densification. Therefore, it would be more desirable to produce a fine cell polyurethane carpet cushion using a toluene diisocyanate ("TDI") formulation with a larger operating window. Furthermore, especially for carpet cushion applications, it would be desirable to produce foams with higher durability and higher IFD, yet still maintain a relatively low foam density (i.e., at about 3 to 4 lb/ft$^3$).

The prior art does not disclose methods for making fine cell, high durability polyurethane foams at a moderate density, nor does the prior art disclose carpet cushions made from such foams.

SUMMARY OF THE INVENTION

According to the invention, flexible, fine celled, high durability polyurethane carpet cushioning foams are produced by preparing a specified foam reaction mixture and foaming that mixture at or above atmospheric conditions, preferably at pressures in the range of 1.05 to 1.5 bar (absolute), most preferably 1.05 to 1.3 bar (absolute). The reaction mixture contains (a) a polyol mixture of (i) about 10 to 70 percent by weight total polyols of a polyether polyol having up to 85 percent ethylene oxide groups, and !i having a hydroxyl number in the range of about 20 to 60 and a functionality from 2.8 to 3.5, and (ii) about 30 to 90 percent by weight total polyols of a graft polyol having a ratio of styrene to acrylonitrile of about 70/30 to about 50/50, and having a hydroxyl number in the range of about 25 to 60 and a functionality from 2.5 to 3.0; (b) toluene diisocyanate wherein the isocyanate index is in the range of 95 to 135; and (c) from about 1.2 to 2.5 parts per hundred parts polyol of water as a blowing agent.

Most preferably, the foam-forming composition contains up to 2 parts per hundred parts polyol of an amine catalyst, up to 2 parts per hundred parts polyol of a surfactant, up to 0.5 parts per hundred parts polyol of an organotin catalyst, and up to 2 to 6 parts per hundred parts polyol of a cross linking agent.

In addition, excellent results have been obtained using a preferred polyol combination of (a) from 25 to 60% by weight total polyols of polyether polyol (functionality 3.1 to 3.3), having 50 to 80 percent EO groups and a hydroxyl number in the range of 25 to 35, and (b) from about 40 to 75 percent by weight total polyols of a graft polyol having a ratio of styrene to acrylonitrile of about 70 to 30, and having a hydroxyl number in the range of about 25 to 30 and a functionality from 2.8 to 2.9, and reacting with toluene diisocyanate wherein the isocyanate index was in the range of 105 to 115. In this preferred embodiment, from about 1.6 to 2.2 parts per hundred parts polyol of water as a blowing agent; and up to 1.0 parts per hundred parts polyol of a surfactant are included in the reaction mixture.

The resulting polyurethane foams have densities in the range of about 2.5 to 4.5 pounds per cubic foot, preferably about 3 to 4 pounds per cubic foot, and fine cell sizes of about 70 pores per linear inch or finer (e.g., $\geq$70 ppi), most preferably about 80 pores per linear inch or finer (e.g., $\geq$80 ppi). Such foams further retain over 70% of their IFD$_{25}$ after 12,000 cycles and over 60% after 50,000 cycles in the roller shear fatigue test. In addition, the foams have a low surface roughness (preferably Ra under 0.25 mm as measured by perthometer). The foams are well suited for use as prime carpet cushion or as component foam for rebonded carpet cushion.

DESCRIPTION OF THE PREFERRED EMBODIMENT

Figure 1:
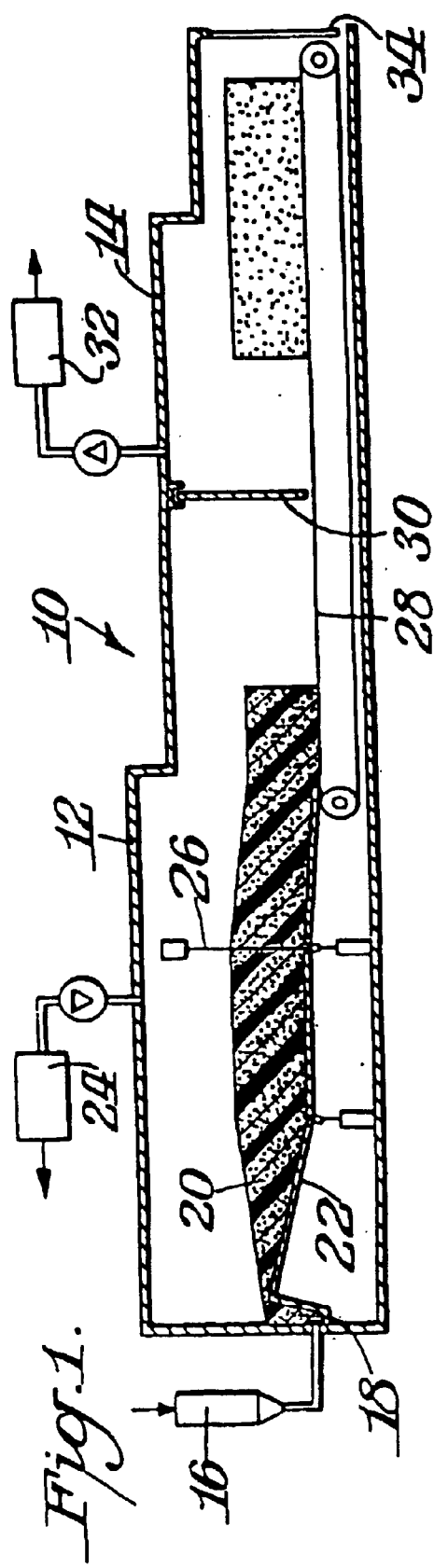
FIG. 1 is a schematic drawing of an apparatus that may be used to form foams under controlled pressures at or above atmospheric pressure.

Polyether polyols used to prepare flexible polyurethane foams typically have molecular weights between 500 and 7000. One example of these conventional polyols is VORANOL® 3010 from Dow Chemical, which has a hydroxyl ("OH") number of 56 mg KOH/g and a functionality of 2.9, with an EO content of 8.5% and a reported molecular weight of about 3000±100.

The term "polyether polyol" includes linear and branched polyethers (having ether linkages) and containing at least two hydroxyl groups, and includes polyoxypropylene polyether polyol or mixed poly (oxyethylene/oxypropylene) polyether polyol. Preferred polyethers are the polyoxyalkylene polyols, particularly the linear and branched poly (oxyethylene) glycols, poly (oxypropylene) glycols and their copolymers. Graft or modified polyether polyols are those polyether polyols having a polymer of ethylenically unsaturated monomers dispersed therein. Representative modified polyether polyols include polyoxypropylene polyether polyol into which is dispersed poly (styrene acrylonitrile) or polyurea, and poly (oxyethylene/oxypropylene) polyether polyols into which is dispersed poly (styrene acrylonitrile) or polyurea. Graft or modified polyether polyols contain dispersed polymeric solids. The solids increase hardness and mechanical strength of the resultant foam. Especially preferred graft polyols in this invention are ARCOL HS-100 from Bayer AG or Dow VORANOL 3943.

The "hydroxyl number" for a polyol is a measure of the amount of reactive hydroxyl groups available for reaction. The value is reported as the number of milligrams of potassium hydroxide equivalent to the hydroxyl groups found in one gram of the sample. "Functionality" of a polyol is defined as the average number of hydroxyl groups per molecule.

A preferred polyol combination for the invention has from 10 to 70% by weight conventional polyether polyol and 30 to 90% by weight graft polyol. The preferred polyether polyol has a functionality from 2.8 to 3.5 and hydroxyl number from 20 to 60. The polyether polyol should contain from up to 85% EO and greater than 75 primary OH groups. The preferred graft polyol has a functionality from 2.5 to 3.0 and an hydroxyl number from 25 to 60. The preferred graft polyol should contain styrene and acrylonitrile where the styrene content in the styrene/acrylonitrile mixture is in the range of 50 to 70%.

The amount of isocyanate employed is frequently expressed by the term "index" which refers to the actual amount (i.e., stoichiometric amount) of isocyanate required for reaction with all of the active hydrogen-containing compounds present in the reaction mixture multiplied by 100. For most foam applications, the isocyanate index is in the range from 75 to 140. In this invention, the preferred isocyanate index is in the range of 95 to 135, most preferably 105 to 115.

In this invention, the isocyanate is toluene diisocyanate or TDI. A well known toluene diisocyanate is TD80, a commercially available blend of 80% of 2, 4-toluene diisocyanate and 20% of 2, 6-toluene diisocyanate.

Catalysts are used to control the relative rates of water-isocyanate (gas-forming) and polyol-isocyanate (gelling) reactions. The catalyst may be a single component, or in most cases a mixture of two or more compounds. Preferred catalysts for polyurethane foam production are organotin salts and tertiary amines. The amine catalysts are known to have a greater effect on the water-isocyanate reaction, whereas the organotin catalysts are known to have a greater effect on the polyol-isocyanate reaction. Total catalyst levels generally vary from 0 to 5.0 parts by weight per 100 parts polyol. The amount of catalyst used depends upon the formulation employed and the type of catalyst, as known to those skilled in the art. Although various catalysts may be used in the present invention, control of the gelling catalyst level is critical to producing foams with desired air permeability, which is a factor known to significantly affect foam cushioning performance. We have found that the following ranges of catalyst amounts are satisfactory: amine catalyst from 0 to 2 parts per 100 parts polyol; and organotin catalyst from 0 to 0.5 parts per 100 parts polyol.

One or more surfactants are also employed in the foam-forming composition. The surfactants lower the bulk surface tension, promote nucleation of bubbles, stabilize the rising cellular structure and emulsify incompatible ingredients. The surfactants typically used in polyurethane foam applications are polysiloxane-polyoxyalkylene copolymers, which are generally used at levels between about 0.5 and 3 parts by weight per 100 parts polyol. In the present invention from 0 to 2 parts by weight per 100 parts polyol of surfactant is preferred, and 1 part by weight per 100 parts polyol is most preferred.

A blowing agent may be included in the foam-forming composition. The most typical blowing agent is water that may be added in amounts from 1.2 to 2.5 parts per hundred parts polyol, or more preferably from 1.7 to 2.3 parts per hundred parts polyol. Preferably, water as blowing agent is added in an amount suitable to achieve a desired foam density, and the amount may vary depending upon the operating pressure in the foaming chamber. We have found that at pressures in the range of 1.05 to 1.5 bar, from 1.2 to 2.5 parts per hundred parts polyol is an appropriate amount of water to achieve a foam with a density of about 2.5 to 4.5 pounds per cubic feet.

Cross-linking agents may be included in the foam-forming composition to enhance processing and foam stability. Typically, cross-linking agents are relatively small molecules containing 2 or 3 active hydrogen groups, and are added in amounts from 0 to 6 parts per hundred parts polyol. Representative cross-linking agents that may be included in the reaction mixture of the invention are diethanolamine (DEOA), ethylene glycol (EG), diethylene glycol (DEG), propylene glycol (PG), dipropylene glycol (DPG), 1, 4-butanediol (BDO), commercially available Bayer AF DP1022 and R2580. Most preferably, the cross-linking agents are included in amounts from 2.0 to 6.0 parts per hundred parts polyol.

Optionally, other additives may be incorporated into the foam-forming composition. The optional additives include, but are not limited to, fire retardants, stabilizers, antimicrobial compounds, extender oils, dyes, pigments, and antistatic agents. Such additives should not have a detrimental effect on the properties of the final polyurethane foam.

The foam-forming process may be carried out batch-wise, semi-continuously or continuously, as long as the pressure may be controlled and maintained at or above atmospheric pressure, preferably in the range of about 1.05 to 1.5 bar (absolute), most preferably 1.05 to 1.3 bar (absolute). The foams produced with the stated reaction mixtures at these pressures have densities in the range of 2.5 to 4.5 pounds per cubic foot (lbs/ft$^3$ or pcf), preferably 3.0 to 4.0 pcf.

FIG. 1 shows in schematic an apparatus that might be used to practice the invention in a continuous process. The figure is taken from the disclosure in W093/09934. In such an apparatus 10, there is a process subchamber 12 and an adjacent airlock subchamber 14. The subchambers 12, 14 are separated from one another by door 30. Foam-forming ingredients are introduced to mix head 16 and mixed for a suitable time. Once mixed together, the foam-forming ingredients form a frothing liquid that is introduced to the bottom of trough 18 and flows upwardly and onto the fall plates 22. The foam rises as it is conveyed away from the trough. After the foam is completely risen, a foam slab 25 is then cut from the foamed material using cut off blade 26. The slab is conveyed by the moving conveyor 28. Fan 24 exhausts process gases to maintain the pressure within the process enclosure 12. The first door 30 opens to allow the slab 25 into the airlock enclosure 14. The door 30 closes and the pressure inside the airlocked chamber is returned to atmospheric conditions. A second exhaust fan 32 removes additional process gases. The foam slab 25 exits the airlock chamber 14 through door 24. The airlock chamber 14 is returned to operating pressure and the process continues.

The invention is further illustrated, but not limited by, the following examples.

EXAMPLES

Foams were prepared batch-wise on a laboratory scale in a fixed head foam machine with the formulations listed in Table 1. The water, isocyanate, polyols, surfactants, catalysts and other additives were poured from the fixed mixing head into a box positioned inside a chamber. The pressure was maintained above atmospheric pressure by pumping air into the chamber as needed. Using a pressure regulator, the pressure was maintained at the operating pressure while the foam was allowed to rise. In the case of foams made at 1 Bar pressure (1000 mbar)(absolute), the boxes were located outside the chamber as pressure control was not necessary.

IFD or "indentation force deflection" was determined in accord with a procedure similar to ASTM D 3574. In this case, for IFD$_{25}$, foam was compressed by 25% of its original height and the force was reported after one minute. The foam samples were cut to a size 15"×15"×4" prior to testing.

Tear strength (pli), tensile strength (psi), elongation (%) also were measured according to the procedures set forth in ASTM D 3574. Air permeability was determined in cubic feet per square foot per minute for each sample using a Frazier Differential Pressure Air Permeability Pressure Machine in accord with ASTM 737.

To quantify the hand touch, a perthometer was used to measure the surface roughness of the sample foams. Microscopically, the surface of any foam sample consists of a series of "hills" and "valleys". The "Ra" is the average height of these high and low points of the surface. A high Ra value indicates a rough surface, and a low Ra value indicates a smooth surface. The European standard DIN 4768 provides additional details of the surface roughness test. To prevent different surface smoothness measurements attributable to varying saws used to cut samples, the samples were cut using the same saw.

Pore size is measured by counting the foam pores when the foam sample is held under a microscope. Pore sizes of 70 pores per linear inch or higher indicate a fine pore sizes.

applied to the foam sample during the roll shear test by adjusting the gap between the two rolls of the test unit. Shear was supplied by rotating the rolls at different rates. Fatigue was measured by determining the percent loss of $IFD_{25}$ and thickness. In calculating the percent loss, the initial $IFD_{25}$ and thickness measurements were taken before the start of the test and the final measurements were taken 24 hours after the completion of 12,000 cycles.

The hexapod fatigue test was performed according to the procedures set forth in ASTM D 5252-92. The samples were inspected after 10,000, 20,000 and 30,000 cycles. A higher rating indicates better quality, and therefore higher durability of the sample.

The rebond samples #1 and #2 were provided by Foamex Carpet Cushion LLC of Linwood, Pa. and are sold under the trademark GFI®.

TABLE 1

| | | A | B compare | C | D | E compare | Rebond #1 | Rebond #2 | Carpet only |
|---|---|---|---|---|---|---|---|---|---|
| Polyol | HS100 | 65 | 50 | 58 | 70 | 73 | | | |
| Polyol | V-4001 | 0 | 0 | 0 | 0 | 0 | | | |
| Polyol | R-2580 | 12 | 0 | 12 | 12 | 0 | | | |
| Polyol | P-2130 | 23 | 0 | 30 | 18 | 0 | | | |
| Polyol | V-3010 | 0 | 50 | 0 | 0 | 0 | | | |
| Polyol | V-3137A | 0 | 0 | 0 | 0 | 27 | | | |
| Surfactant | L-618 | 1 | 1 | 1 | 1 | 1 | | | |
| Amine | ZF123 | 0.12 | 0.12 | 0.08 | 0.08 | 0.19 | | | |
| tin catalyst | T-9 | 0.1 | 0.15 | 0.15 | 0.13 | 0.12 | | | |
| Water | | 2.2 | 2.2 | 2.2 | 1.9 | 1.96 | | | |
| Isocyanate | TDI 80/20 | 27.1 | 30.2 | 27.9 | 25.3 | 28.9 | | | |
| | Index | 105 | 105 | 108 | 110 | 117 | | | |
| | Chamber Pressure (mbar) | 1050 | 1050 | 1300 | 1300 | 1000 | | | |
| | Density (pcf) | 2.8 | 2.8 | 3.1 | 3.6 | 3.0 | 6 | 8 | |
| | $IFD_{25}$ (lb) | 97.4 | 98.2 | 123 | 156 | 129 | | | |
| | SAG | 2.12 | 2.13 | 2.05 | 2.05 | | | | |
| | ½" perm. (cfm/ft²) | 165 | 137 | 94 | 74 | | | | |
| | Pore size (pores/inch) | 77 | 76 | 87 | 84 | 66 | | | |
| | Surface roughness (mm) | — | — | — | 0.20 | 0.41 | — | — | |
| Roll shear fatigue test | IFD25 retention after 12K cycles* | 72.9% | 70.7% | 76.8% | 79.7% | 47.5% | 72.2% | 73.8% | |
| Roll shear fatigue test | IFD25 retention after 50K cycles* | 60.5% | 44.2% | 75.7% | 76.6% | 28.0% | 64.5% | 65.2% | |
| Roll shear fatigue test | Height retention after 12K cycles* | — | — | 100% | 100% | 97.6% | 96.7% | 95.5% | |
| Hexapod fatigue test | Rating after 10K cycles** | | | 4.5 | 4.0 | 3.5 | 4.0 | 4.5 | 2.5 |
| Hexapod fatigue test | Rating after 20K cycles** | | | 3.5 | 3.5 | 3.0 | 3.0 | 3.5 | 2.0 |
| Hexapod fatigue test | Rating after 30K cycles** | | | 3.0 | 3.0 | 2.5 | 2.5 | 2.5 | 1.5 |

*These IFD measurements were taken at the end of fatigue after the specified number of roller-shear cycles.
**A higher rating indicates the sample was more fatigue resistant.
***Samples C, D and E were prepared in a commercial foam machine.

A foam with 60 pores per linear inch is "coarser" than a foam with 70 pores per linear inch.

In the roll shear fatigue test, a two roller mill with adjustable gap between the rollers was used. The rollers were 8.5 inches in diameter and rotated at a frequency of 5.9 cycles/minute. In setting up the test, a 190-pound weight was applied on the sample to determine the amount of compression that the foam cushion undergoes during a normal walking step. The same amount of compression was The polyols were obtained from the following suppliers: ARCOL® HS100 from Bayer AG; and VORANOL® 3010, 3137A and 4001 from Dow Chemical. The surfactant L-618 was obtained from Crompton. The amine catalyst ZF123 and the tin catalyst T-9 were from Huntsman. TDI 80/20 was from Dow Chemical.

Referring to the data obtained in Table 1, we found that the batch sample according to the invention, Example A, had significantly higher IFD retention (indicating higher durability) than Example B. The major difference between these samples was that Example B did not include the high-EO polyol. The benefits of the high-EO polyol became more apparent in the fatigue tests, where, after 50,000 cycles, Example A had a significantly higher IFD retention at 60% vs. 44% for Example B.

Samples C to E were poured in a commercial foaming machine. In Examples C and D, where the chamber pressure was raised to 1300 mbar (absolute), the foam IFD increased significantly. Both samples according to the invention exhibited excellent IFD retention. In comparison, Example E used a conventional prime carpet cushion foam formulation and showed poor IFD retention.

Example D had a fine cell structure with 84 pores per inch, compared to 66 pores per inch in Example E. Indeed, the surface roughness for Example D was considerably lower at 0.20 mm versus 0.41 mm in Example E. Even though a carpet cushion will be installed under a carpet, consumers subjectively correlate foams with fine cell structures and nice hand touch with higher quality. Thus, the fine cell structure of the foams according to the invention is an added benefit.

From the data, pore size and foam durability appear to correlate. In Table 1, it can be seen that the foams with finer pore sizes had higher durability. The trend was most apparent in the IFD retention after 50K roll-shear cycles.

For comparison, fatigue resistance for the 6 and 8 lb/ft$^3$ rebond carpet cushions was determined. As shown, in the roll shear fatigue test, although the IFD retention after 12,000 cycles for the rebond samples was comparable to the samples according to the invention, the rebond fatigue resistance was noticeably lower after 50,000 cycles. In addition, in the hexapod fatigue test, although the 8 lb/ft$^3$ rebond sample was initially rated highly, its rating dropped rapidly upon further fatigue to 30,000 cycles. On the other hand, the samples according to the invention outperformed the higher density rebond after 20,000 cycles.

Thus, the combination of foaming ingredients, particularly the use of high EO polyol and above atmospheric pressure-foaming in Examples A, C and D according to the invention, produced a fine cell, high durability foam ideal for carpet cushion applications. The foams according to the invention have consistent density, but provide much greater durability than conventional foams used today for cushioning applications.

The invention has been illustrated by detailed description and examples of the preferred embodiments. Various changes in form and detail will be within the skill of persons skilled in the art. Therefore, the invention must be measured by the claims and not by the description of the examples or the preferred embodiments.

We claim:

1. A method for producing a durable polyurethane foam, comprising the steps of:
    (1) preparing a reaction mixture comprising:
        (a) a polyol mixture of (i) about 10 to 70 percent by weight total polyols of a polyether polyol having up to 85 percent ethylene oxide groups, and having a hydroxyl number in the range of about 20 to 60 and a functionality from 2.8 to 3.5, and (ii) about 30 to 90 percent by weight total polyols of a graft polyol having a ratio of styrene to acrylonitrile of about 70 to 30, and having a hydroxyl number in the range of about 25 to 60 and a functionality from 2.5 to 3.0;
        (b) toluene diisocyanate wherein the isocyanate index is in the range of 95 to 135; and
        (c) from about 1.2 to 2.5 parts per hundred parts polyol of water as a blowing agent; and
    (2) allowing said reaction mixture to react while held at a pressure of about 1.0 to 1.5 bar (absolute) so as to form the polyurethane foam.

2. The method of claim 1, wherein the resulting polyurethane foam has a density in the range of 2.5 to 4.5 pounds per cubic foot.

3. The method of claim 1, wherein the resulting polyurethane foam has a fine cell structure with at least about 70 pores per inch.

4. The method of claim 1, wherein the reaction mixture reacts while held at a pressure of about 1.05 to 1.3 bar (absolute).

5. The method of claim 1, wherein the resulting polyurethane foam has a surface roughness (Ra) below about 0.25 mm.

6. The method of claim 1, wherein the reaction mixture contains from two to six parts by weight per hundred parts polyol of a cross linking agent.

7. The method of claim 1, wherein the reaction mixture contains up to two parts by weight per hundred parts polyol of a surfactant.

8. The method of claim 1, wherein the reaction mixture contains up to two parts by weight per hundred parts polyol of a catalyst.

9. The method of claim 1, wherein the reaction mixture contains up to two parts by weight per hundred parts polyol of an amine catalyst.

10. The method of claim 1, wherein the reaction mixture contains up to 0.5 parts by weight per hundred parts polyol of a tin catalyst.

11. The method of claim 1, wherein the isocyanate index is in the range of from 105 to 115.

12. The method of claim 1, wherein the durable polyurethane foam produced has a density in the range of 3.0 to 4. pounds per cubic foot.

13. The method of claim 1, wherein the durable polyurethane foam produced when subjected to a roller shear fatigue test retains over 70% of its IFD$_{25}$ after 12,000 cycles.

14. The method of claim 1, wherein the durable polyurethane foam produced when subjected to a roller shear fatigue test retains over 60% of its IFD$_{25}$ after 50,000 cycles.

15. A polyurethane foam produced according to the method of claim 1.

16. A carpet cushion formed from the polyurethane foam produced according to the method of claim 1.

17. A flexible polyurethane foam produced from a reaction between a polyether polyol and graft polyol blend with toluene diisocyanate, wherein the improvement comprises:
    forming the polyol blend of (i) about 10 to 70 percent by weight total polyols of a percent ethylene oxide groups, and having a hydroxyl number in the range of about 20 to 60 and a functionality from 2.8 to 3.5, and (ii) about 30 to 90 percent by weight total polyols of a graft polyol having a ratio of styrene to acrylonitrile of about 70 to 30, and having a hydroxyl number in the range of about 25 to 60 and functionality from 2.5 to 3.0; and
    reacting the polyol blend with toluene diisocyanate wherein the isocyanate index is in the range of 95 to 135; and wherein the foam has cell sizes of about 70 pores per inch or finer.

18. The polyurethane foam of claim 17, wherein the reaction is carried out at an elevated pressure maintianed in the range of about 1.05 to 1.5 bar (absolute).

19. A carpet cushion formed from the flexible polyurethane foam of claim 17.

* * * * *

UNITED STATES PATENT AND TRADEMARK OFFICE
CERTIFICATE OF CORRECTION

| | |
|---|---|
| PATENT NO. | : 6,716,890 B1 |
| APPLICATION NO. | : 10/354925 |
| DATED | : April 6, 2004 |
| INVENTOR(S) | : Beat B. Niederoest et al. |

It is certified that error appears in the above-identified patent and that said Letters Patent is hereby corrected as shown below:

On the Cover Page, item [57], the Abstract should read

-- Polyurethane foams formed using a specific mixture of polyether and graft polyols with toluene diisocyanate have fine cell size (over 70 pores per inch) and higher durability with $IFD_{25}$ retention over 70% after 12,000 cycles of roll-shear. The foam-forming ingredients are mixed together and foamed at controlled pressures in the range 1.0 to 1.5 bar (absolute), preferably 1.05 to 1.5 bar (absolute). The foams make particularly good carpet cushions. --.

In Claim 17, at Col. 10, line 50, before "percent" insert -- polyether polyol having up to 85 --.

In Claim 18, at Col. 10, line 62 "maintianed" should read -- maintained --.

Signed and Sealed this

Twenty-ninth Day of January, 2008

JON W. DUDAS
*Director of the United States Patent and Trademark Office*